United States Patent [19]

Waddill

[11] 4,139,524

[45] Feb. 13, 1979

[54] BIS UREIDE OF A POLYOXYALKYLENE POLYAMINE AS AN EPOXY ADDITIVE

[75] Inventor: Harold G. Waddill, Austin, Tex.

[73] Assignee: Texaco Development Corporation, New York, N.Y.

[21] Appl. No.: 811,816

[22] Filed: Jun. 30, 1977

[51] Int. Cl.² .............................................. C08G 59/56
[52] U.S. Cl. .................... 528/109; 156/330; 260/2.01; 260/552 R; 260/553 R; 260/830 R; 528/111
[58] Field of Search .......... 260/552 R, 553 R, 47 EN, 260/830 R, 2 N

[56] References Cited

U.S. PATENT DOCUMENTS

| 3,324,176 | 6/1967 | Kirschnek et al. .................. 260/553 |
| 3,386,955 | 6/1968 | Nawakowski et al. ................ 260/47 |
| 3,717,612 | 2/1973 | Babayan .......................... 260/47 EN |
| 3,943,104 | 3/1976 | Waddill .......................... 260/47 EN |
| 4,002,598 | 1/1977 | Waddill et al. .................. 260/47 EN |

*Primary Examiner*—Lester L. Lee
*Assistant Examiner*—E. A. Nielsen
*Attorney, Agent, or Firm*—James L. Bailey

[57] ABSTRACT

The adhesive strength of amine-cured epoxy resins are improved by the addition of a bis ureide of a polyoxyalkylene polyamine additive. The improved epoxy resin composition comprises a vicinal polyepoxide, an effective amount of a polyamine curing agent, and an effective amount of an adhesive strengthening additive consisting essentially of a bis ureide of a polyoxyalkylene polyamine, said additive having an average molecular weight of at least 4,000.

13 Claims, No Drawings

BIS UREIDE OF A POLYOXYALKYLENE POLYAMINE AS AN EPOXY ADDITIVE

BACKGROUND OF THE INVENTION

Epoxy resins have a broad range of physical characteristics and, because of this, they are used in many industrial applications. Epoxy resins have at least one epoxy group which can be converted to a thermoset form having desirable properties. These epoxy groups may be cured by the use of a catalyst or a curing agent. The curing may be accelerated by the addition of small but effective amounts of accelerating agents.

There are many different types of curing agents which may be utilized. Amines and, more specifically, aliphatic amines are commonly employed as curing agents. For example, diethylenetriamine, triethylenetetramine and polyoxyalkylene polyamines such as polyoxypropylene-diamines and triamines have been utilized as curing agents.

The physical properties of epoxy resin compositions have been improved by using curing agents such a polyoxyalkylene-amines and, in particular, polyoxyalkylenediamines. Physical properties of epoxy resin compositions have also been improved by using co-curing agents such as those described in U.S. Pat. No. 3,549,592. Ureas and substituted areas have been utilized as epoxy curing agents, co-curing agents and curing accelerators. These urea and substituted urea compounds have been disclosed in U.S. Pat. Nos. 3,294,749; 2,713,569; 3,386,956; 3,386,955; 2,855,372; and 3,639,338.

Compounds having a single terminal ureido group have been disclosed in U.S. Pat. Nos. 2,145,242 and 3,965,072.

RELATED PATENT APPLICATIONS

U.S. Ser. No. 743,814 filed on Nov. 22, 1976 and jointly invented by Schulze and Waddill disclosed that a diureide terminated polyoxyalkylene material having a molecular weight of from about 2,000 to about 3,000 may be employed as an epoxy additive to improve the adhesive strength of amine cured epoxy resin compositions.

U.S. Ser. No. 743,877 filed on the same date and discovered by the same inventors as stated above, disclosed that the same additive as disclosed in the above referenced application was useful in enhancing the thermal shock resistance of an anhydride cured epoxy resin.

Each of the above related applications is incorporated by reference herein.

U.S. Ser. No. 743,815 filed on Nov. 22, 1976 and discovered by the same inventors as stated above, disclosed that an amine terminated polyether ureylene having a molecular weight of 4,000 to 4,500 may be employed as an epoxy additive-curing agent to improve the adhesive strength of epoxy resin compositions.

Filed concurrently herewith is U.S. Ser. No. 811,802 filed on June 30, 1977 discovered by H. G. Waddill, the same inventor of the invention disclosed herein. That application concerns the use of the same additives of the instant invention; however in that invention they are used to improve the thermal shock resistance of anhydride cured epoxy resin compositions.

SUMMARY OF THE INVENTION

Suprisingly, smaller quantities of the additive of the instant invention are required to improve the adhesive strength of cured resins than are required when the additive of U.S. Ser. No. 743,814 is employed.

The instant invention provides a composition useful for increasing the adhesive strength of an amine cured epoxy resin. In particular, this invention is directed to an adhesive strengthening additive consisting essentially of a bis ureide of a polyoxyalkylene polyamine, said additive having an average molecular weight of at least 4,000.

The additive of the instant invention has the following formula:

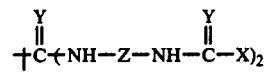

Wherein X is hydrogen or a primary amino group; Y is oxygen or sulfur; and Z is a polyoxyalkylene group having a sufficient molecular weight such that the additive has an average molecular weight of at least 4,000.

In one aspect of the instant invention there is provided an epoxy resin composition produced from a curable admixture which comprises: a vicinal polyepoxide having an epoxide equivalence of greater than 1.8; an effective amount of a polyamine curing agent having at least three reactive amino hydrogens; and an effective amount of an adhesive strengthening additive consisting essentially of a bis ureide of a polyoxyalkylene polyamine, said additive having an average molecular weight of at least 4,000.

In a preferred aspect of the instant invention an additive which is useful in improving the adhesive strength of an epoxy resin composition is a bis (acyl) polyoxypropylene diamine and this additive has an average molecular weight of about 4,000.

In yet another preferred aspect of the instant invention there is provided a bis (thio) polyoxypropylene diamine additive useful for improving the adhesive strength of an epoxy resin composition and this additive has a molecular weight of about 4,000.

DETAILED DESCRIPTION OF THE PREFERRED EMBODIMENTS

The adhesive strength of amine cured epoxy resin compositions may be improved by the addition of an effective amount of a bis ureide of a polyoxyalkylene polyamine having an average molecular weight of at least 4,000. The preferred additive is the α, ω-bis ureide or the bis (thio) ureide of a polyoxyalkylene diamine having an average molecular weight of about 4,000. Generally, the preferred additive is a bis ureide of a polyoxypropylene diamine, said additive having a molecular weight of about 4,000. The bis ureides of the instant invention are of the formula:

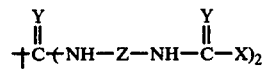

Wherein X is hydrogen of a primary amino group; Y is oxygen or sulfur; and Z is a polyoxyalkylene group having a sufficient molecular weight such that the additive has a molecular weight of at least 4,000.

It should be noted that the terminology "average molecular weight" is utilized with reference to compositions described herein and in each instance that term is used because the chain length of the polymeric portion, e.g., the polyoxyalkylene portion of a polyamine, may vary. Accordingly, that terminology provides a more accurate description of each composition.

The bis ureide compounds are formed by the reaction of urea or a mono-substituted urea compound with a polyoxyalkylene polyamine having a molecular weight such that the bis ureide product has a molecular weight of approximately 4,000. The reactants should be admixed in a molar ratio of 2 to 3; that is, 2 moles of the polyoxyalkylene polyamine to 3 moles of urea or a mono-substituted urea compound should be reacted. Generally, the reaction can take place at ambient pressure and at temperatures from 25° C. to about 150° C.

In a preferred embodiment of the instant invention the bis ureide additives are formed by reacting urea with polyoxyalkylene diamines of the formula:

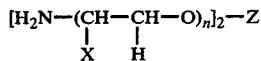

Wherein X is a hydrogen, a methyl radical or an ethyl radical; Z is an aklylene radical having from 2 to 5 carbon atoms; and n is a number from about 15 to about 25. A preferred diamine is polyoxypropylene diamine wherein X is a methyl radical, n is a number from 16 to 19 and Z is a 1,2-propylene radical. These polyoxyalkylene polyamines can be prepared in accordance with the methods disclosed in U.S. Pat. Nos. 3,236,895 and 3,654,370 and those patents are incorporated herein by reference.

As previously indicated, urea may be employed as a reactant with the polyoxyalkylene polyamine to produce the bis ureide additive. With urea as a reactant, ammonia evolves as the terminal primary amino groups of the polyoxyalkylene polyamine are converted to ureido groups.

Mono-substituted urea compounds can also be used as reactants. For example isocyanates of the formula R–N=C=O wherein R is either an aliphatic or aromatic monovalent radical.

Usually, a specific molar ratio of the reactants should be utilized. For example, when urea and a polyoxyalkylene diamine are utilized as the reactants, the ratio of urea to polyoxyalkylene diamine should be about 3 moles to 2 moles, respectively. Generally, it is desirable to utilize a slight excess of the urea or mono-substituted urea compound in order to assure complete conversion of the amino groups of the polyoxyalkylene compound.

Thus, in the preferred embodiment, with urea and a polyoxypropylene (1,2-propylene) diamine having an average molecular weight of 2,000 as the reactants, one molecule of urea is needed to link two polyoxypropylene diamine molecules and two other molecules of urea are required to react with the terminal amino groups of the polyoxypropylene diamine.

Alternatively, the bis ureide additive may be prepared in a two step method. In the first step 2 moles of a polyoxyalkylene polyamine are reacted with 1 mole of urea or a mono-substituted urea compound. In the first step one molecule of urea links two of the polyoxyalkylene polyamine molecules. In the second step, the product of the first step may be reacted with urea in a molar ratio of 1:2 to form the bis ureide additive of this invention. In the second step, the terminal amino groups of the product of the first step react with urea to form terminal ureido groups.

In accordance with this invention, an epoxy resin composition having improved adhesive strength may be prepared by admixing the following ingredients: a polyepoxide, an effective amount of a polyamine curing agent and an effective amount of an adhesive strengthening additive consisting essentially of a bis ureide of a polyoxyalkylene polyamine, said additive having an average molecular weight of at least 4,000. In addition to the ingredients listed above, an accelerator may be admixed with the curable resin composition in order to accelerate the cure.

The polyepoxides which may be used in accordance with this invention are vicinal compositions which can be amine cured and have an average of at least 1.8 reactive 1,2-epoxy groups per molecule. These polyepoxides can be monomeric or polymeric, saturated or unsaturated, aliphatic, cycloaliphatic, aromatic or heterocyclic, and may be substituted other than with epoxy groups. For example, these substituted substituents may be hydroxyl groups, ether radicals, aromatic halogen radicals and the like. Usually such substituents should be unreactive with the amine groups of the polyamine under the conditions employed for curing the resin.

It is preferred to utilize glycidyl ethers which are prepared by epoxidizing the corresponding allyl ethers or by reacting a molar excess of epichlorohydrin and an aromatic polyhydroxy compound such as isopropylidene bisphenol, novolak, and resorcinol. In addition, the epoxy derivatives of methylene or isopropylidene bisphenols are preferred.

In accordance with this invention one class of polyepoxides which may be used are resinous epoxy polyethers which may be obtained by reacting an epihalohydrin with either a polyhydric phenol or a polyhydric alcohol. For example, suitable dihydric phenols include 4,4'-isopropylidene bisphenol, 2,4'-dihydroxydiphenylethylmethane, 3,3'-dihydroxydiphenyldiethylmethane, 3,4'-dihydroxydiphenylmethylpropyl methane 2,3'-dihydroxydiphenylethylphenyl methane, 4-4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane. Many other polyhydryic phenols may be co-reacted with epihalohydrin to provide these epoxy polyethers. These polyhydric phenols include resorcinol, hydroquinone, and substituted hydroquinones.

Many polyhydric alcohols can be co-reacted with epihalohydrin to provide the epoxy polyethers. For example, ethylene glycol, propylene glycols, butylene glycols, pentane diols, bis (4-hydroxycyclohexyl) dimethylmethane, 1,4-dimethylolbenzene, glycerol, 1,2,6-hexanetriol, trimethylpropane, mannitol, sorbitol, erythritol, pentaerythritol, their dimers, trimers and higher polymers, such as polyethylene glycols, polypropylene glycols, triglycerol, dipentaerythritol, polyallyl alchol, polyhydric thioethers, such as 2,2'-, 3,3'-tetrahydroxydipropylsulfide, mercapto alcohols such as monothioglycerol and dithioglycerol, polyhydric alcohol partial esters such as monostearin, pentaerythritol, monoacetate, and halogenated polyhydric alcohols such as the monochlorohydrins of glycerol, sorbitol, and pentaerythritol.

Other polyepoxides which may be utilized in accordance with the instant invention include epoxy novolak resins obtained by reacting an epihalohydrin with the resinous condensate of an aldehyde and either a monohydric phenol or a polyhyric phenol, in the presence of a basic catalyst such as sodium or potassium hydroxide. Other information concerning the nature and preparation of these epoxy novolak resins may be obtained from Lee, H. and Neville, K. *Handbook of Epoxy Resins,* McGraw Hill Book Company, New York, 1967.

It should be understood by those skilled in the art that many polyepoxide compositions may be utilized in accordance with the instant invention. Accordingly, the above description of suitable polyepoxides was not intended to be limited or exhaustive of all suitable polyepoxides; rather, it was intended to be exemplary of those polyepoxides which may be utilized in accordance with the invention.

With respect to the amine curing agents which may be utilized in accordance with the instant invention, generally any amine curing agent which is useful in the curing of vicinal epoxides may be used. These amine curing agents generally have at least three reactive amino hydrogens.

In accordance with this invention alkylene polyamines, oxyalkylene polyamines, and triamino and diamino derivatives of ethylene glycol may be utilized as curing agents. For example, diethylene triamine, triethylene tetramine, polyoxypropylene, and 1,13-diamino, 4,7,10-trioxatridecane may be utilized.

In addition, aromatic amine curing agents and the corresponding cycloaliphatic compounds may be utilized. For example, the alkylene-linked polyphenyl amines, phenylene diamines and polycyclic or fused aromatic primary amine compounds may be utilized.

Other curing agents which may be utilized are polyamine curing agents such as the condensation products of polyamines and polycarboxylic acids. As an example of such amine compounds, the condensation product of a polyamine and a dimerized fatty acid as prepared in accordance with U.S. Pat. No. 2,379,413 may be utilized.

In accordance with this invention, it is preferred to utilize polyoxyalkylene polyamine compounds as curing agents. These compounds are shown by the formula:

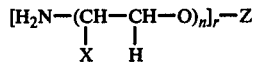

Wherein X is hydrogen, a methyl radical or an ethyl radical; Z is a hydrocarbon radical having 2 to 5 carbon atoms forming from 2 to 4 external ether linkages; n is a number from 1 to about 15 and r is a number from 2 to 4. Highly preferred are the polyoxypropyl diamines wherein X is a methyl radical, n is a number from 1 to 10, Z is a 1,2-propylene radical and r is about 2. These polyoxyalkylene polyamines may be prepared by the methods disclosed in U.S. Pat. Nos. 3,236,895 and 3,654,370 and those patents are incorporated herein by reference. Greatly preferred is a polyoxypropylene diamine having a molecular weight of about 230.

Other curing agents of the polyoxyalkylene polyamine class as depicted in the following formula may be utilized:

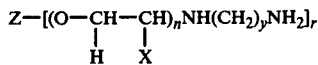

Wherein X, Z, n and r are defined as above and y is 2 or 3. These poly (aminoalkylamino) polyethers are the hydrogenated product of the cyanoalkylated adduct of a polyoxyalkylene polyamine as described above. The cyanoalkylated adducts may be prepared in accordance with the description in U.S. Pat. No. 3,666,788. It is preferred to use the hydrogenated cyanoethylated polyoxypropylene triamines.

As previously indicated, an accelerator may be included in the epoxy resin formulation to speed the cure of the epoxy resin. These accelerators are especially useful when the amine cure takes place at ambient temperatures. In particular, when an epoxy resin is used as an adhesive in a flammable environment, an elevated temperature cure can be hazardous and, hence, it is desirable to use an accelerator in such circumstances.

Many accelerators have been used. For example, salts of phenol, salicylic acids, amine salts of fatty acids such as those disclosed in U.S. Pat. No. 2,681,901, and tertiary amines such as those disclosed in U.S. Pat. No. 2,839,480. A preferred accelerator for use in accordance with the instant invention is disclosed in U.S. Pat. No. 3,875,072 and that patent is incorporated herein by reference. The accelerator disclosed therein comprises a combination of piperazine and an alkanolamine in a weight ratio of about 1:8 to about 1:1.

In accordance with this invention, it should be understood that the amount of the bis ureide additive required to increase the adhesive strength of the epoxy resin composition is empirical and is dependent upon many factors, such as the resin used, the amine curing agent used and the accelerator used, if one is used. Generally, the bis ureide additive can be utilized in amounts from about one to about thirty parts by weight based on 100 parts by weight of the polyepoxide resin constituent and, preferably, from 1 to about 10 parts by weight.

Although the amount of bis ureide additive required to increase the adhesive strength of the resin in empirical, it can be determined by a reasonable amount of routine experimentation. Once an effective amount of the additive has been added to a resin mixture, the epoxy resin composition undergoes a readily visible change. Specifically, the resin becomes opaque and milky white in appearance and this change becomes more visible during the curing step. As a result of this change, the epoxy resin product has a lustrous white appearance. This optical absorption shift enhances the beauty of cast objects and negates the need to use white pigments or fillers.

Of course, if too small an amount of the additive is employed, the adhesive strength of the epoxy resin may not be improved. Similarly, if too great an amount of the additive is employed, other properties of the epoxy resin may be undesirably compromised.

The preferred epoxy resin compositions of the instant invention comprise polyglycidyl ethers of a polyhydric phenols which are cured by admixing with them a curing amount of a polyoxyalkylene polyamine having a molecular weight from about 200 to 500, and an accelerator combination of piperazine and an alkanolamine, the combination having a combined weight ratio of between about 1:8 to 1:1. For example, the epoxy resin compositions disclosed in U.S. Pat. No. 3,943,104 may be admixed with an effective amount of the bis ureide composition of the instant invention in order to improve the adhesive strength of the epoxy resin compositions.

The cured epoxy resin compositions of the instant invention having superior adhesive strength may be prepared in any suitable manner. The amine curing agent may be admixed with the polyepoxide in amounts according to the amine equivalent weight of the curing agent employed. The number of equivalents of the amine groups may vary from about 0.8 to about 1.2 times the number of epoxide equivalence present in the curable epoxy resin. It should be understood that a stoichiometric amount is preferred.

When an accelerator is employed, it may be admixed in amounts from about one to about ten parts by weight based on 100 parts by weight of the resin. Of course, it will be recognized by those in the art that the exact amount of each constituent will vary depending primarily on the intended application of the cured resin. Also, the amount of accelerator employed should be sufficient for the intended purpose of accelerating the amine cure; however, if too much is used, softening of the cured resin may result or other properties may be undesirably compromised.

The bis ureide additive may be incorporated into the uncured resin by admixing. It is preferred that the additive be first admixed with the curing agent and accelerator, if one is used, prior to the addition of the polyepoxide resin. After this step, all of the constituents can be admixed in accordance with standard methods and degassed in the presence of a commercial defoamer and minute amounts of silicone oils. The degassing is required in order to prevent voids and bubbles in the cured resin.

Desirable properties of the cured epoxy resin compositions and especially the adhesive strength of the compositions, have been improved in those resin compositions containing polyglycidyl ethers of polyhydric phenols in amounts greater than 50 percent by weight of the polyepoxide resin constituent. Preferably, these polyhydric phenols are present in an amount of 80 percent by weight and even more preferably 100 percent by weight.

The preferred amine curing agents are polyamines having an amine equivalent weight of from 20 to about 70. For example, polyoxypropylene diamines having a molecular weight in the range of 200 to 300 and polyoxypropylene polyamines having a molecular weight from about 400 to 600 can be utilized.

In accordance with a preferred embodiment of the instant invention, a curable epoxy resin composition comprises: a diglycidyl ether of a 4,4'-isopropylidene bisphenol; a curative amount of a primary amine containing curing agent consisting essentially of a polyoxypropylene diamine having a molecular weight from about 200 to about 250, an accelerator consisting essentially of piperazine and a triethanolamine in a weight ratio of three to seven; and, an effective amount of a bis ureide of a polyoxyalkaline polyamine having an average molecular weight of at least 4,000.

In a most preferred embodiment of the instant invention, the bis ureide of the above formulation consists essentially of a bis ureide of a polypropylene diamine having an average molecular weight of approximately 4,000.

A preferred amount of accelerator used comprises from about one to about ten parts by weight per 100 parts by weight of the polyepoxide resin employed. The accelerator may be a piperazine-alkanolamine accelerator having a weight ratio of between about 1:8 to about 1:1 of piperazine to alkanolamine. The preferred amount of the accelerator may be admixed with a polyoxyalkalene diamine curing agent.

Generally, the mixture of epoxy resin, curing agent, accelerator, and bis ureide additive is allowed to cure at ambient temperatures of between 0° C. and about 45° C.; however, it may be expeditious to cure the mixture at elevated temperatures up to about 135° C. if conditions allow elevated temperatures to be employed.

In accordance with another preferred embodiment, polyepoxide resins of the polyglycidyl ether of a polyhydric phenol may be cured by incorporating a stoichiometric amount of a polyoxyalkalene polyamine having a molecular weight of about 230; from about one to about 30 parts per 100 parts by weight of the polyepoxide resin of the bis ureide of a polyoxypropylene diamine having a molecular weight of about 4,000; and from one to ten weight percent based on 100 parts by weight of the resin of an accelerator consisting essentially of a 30:70 weight percent admixture of piperazine:triethanolamine. This composition may be cured at a room temperature of approximately 25° C. and will result in a cured polyepoxide resin composition having superior adhesive strength.

In accordance with techniques well-known and understood in the art, other additives may be admixed with the polyepoxide compositions of the instant invention prior to curing. For example, it may be desirable to add minor amounts of other polyalkylene amine cocatalysts or hardeners or other accelerator and curing agents as are well-known in the art. In addition, pigments, dyes, fillers, flame retarding additives and other compounds, natural or synthetic, may be added.

Although it has been stated that the bis ureide of this invention has an average molecular weight of at least 4,000, it should be recognized that this average weight is not without an upper limit. As should be apparent to those skilled in the art, as the molecular weight of the additive increases so does its viscosity. Thus, the upper limit of the average molecular weight will be a function of the viscosity of the bis ureide additive. Those skilled in the art will appreciate the undesirability of employing an additive having too high a viscosity.

Solvents for polyepoxides such as toluene, benzene, xylene, dioxane and ethylene glycol monomethylether may be utilized; however, they are not preferred.

The polyepoxide resins of the instant invention may be utilized in any application for which polyepoxide resin compositions are customarily employed. It should be understood that because of the white lustrous surface which the cured composition has, it may be of particular benefit in molding and casting procedures.

It should be appreciated by those of skill in the art, that compositions of the instant invention may be utilized as impregnates, surface coatings, pottings, capsulating compositions, laminants, and of particular importance, as adhesives for bonding metallic elements or structures together.

Suprisingly, smaller amounts of the bis ureide having an average molecular weight of at least 4,000 are required to improve the adhesive strength of epoxy compositions than are required when a bis ureide having an average molecular weight of 2,000 is utilized as an additive.

The following examples are illustrative:

EXAMPLE 1

In this example a bis ureide polypropylene diamine additive for use in accordance with this invention was prepared. The reactants which were utilized in a molar ratio of 2 to 3, respectively, were JEFFAMINE ® D-2000 made by Jefferson Chemical Company, Austin, Texas and urea.

Into a stirred reactor, 65 grams (1.08 moles) of urea and 500 grams of JEFFAMINE D-2000 were added.

This admixture was heated to 135° C., flushed with nitrogen and stirred under a nitrogen pad for approximately two hours at the temperature of 135° C. After this two hour period the remainder of the JEFFAMINE D-2000 (935 grams) was slowly added over a period of 1½ hours while ammonia evolved.

After approximately seven hours at 135° C., the reaction product was vacuum stripped at 175°–180° C./2mm. Hg to produce a viscous residue which had a total amine content of 0.14 meq./g., a primary amine content of 0.05 meq./g. and 1.64% N.

To illustrate the advantage of the bis ureide additives of this invention, various epoxy formulations employing diglycidyl ether of 4,4-isopropylidene bisphenol were cured with various known polyamine curing agents. Where indicated a commercial accelerator was utilized. Three drops of silicone fluid were added to each formulation to prevent the formation of voids and bubbles. After degassing under vacuum, the formulations were cured under the conditions indicated. In the appropriate examples, the cured products were subjected to standard American Society for Testing Materials (ASTM) test for peel strength (ASTM D-903) and the tensile shear strength (ASTM D-1002-64) was measured on adhesive bonds. All substrates were aluminum panels (No. 2024-T-3 alloy, 16 gauge), degreased, then chromic acid etched prior to bonding. The abbreviations used in the table, pbw, psi and g. stand for parts by weight, pounds per square inch and grams, respectively.

EXAMPLES 2-6

In these examples epoxy resins were prepared wherein diglycidyl ether of a 4,4-isopropylidene bisphenol was cured with a polyoxypropylene diamine curing agent having a molecular weight of 230 to which were added the indicated amounts of the bis ureide prepared in example 1. Also added were the indicated amounts of the accelerator.

The resulting resins were used to bond aluminum to aluminum and these bonds were subjected to the ASTM test indicated in Table I.

TABLE I

| Formulation | Examples | | | | |
|---|---|---|---|---|---|
| | 2 | 3 | 4 | 5 | 6 |
| Epoxide, pbw (Eq. 190) | 100 | 100 | 100 | 100 | 100 |
| Curing agent, pbw[1] | 30 | 30 | 30 | 30 | 30 |
| Accelerator, pbw[2] | 10 | 10 | 10 | 10 | 10 |
| bis ureide pbw[3] | 0 | 0 | 2 | 0 | 5 |
| bis ureide, pbw[4] | 0 | 2 | 0 | 5 | 0 |
| Tensile shear, psi[5] | 980 | 1200 | 3300 | 3200 | 4200 |

[1]Sold by Jefferson Chemical Company, Austin, Texas 78751 under the name "JEFFAMINE D-230"
[2]A piperazine-triethanolamine admixture (30:70) sold by Jefferson Chemical Company, Austin, Texas 78751 under the name "Accelerator 398"
[3]The product of Example 1
[4]A bis ureide of a polyoxypropylene having an average molecular weight of 2000 and made in accordance with the disclosure in U.S.S.N. 743,814 filed on November 22, 1976.
[5]Cure: 7 days, Room Temp.

These examples illustrate the improved adhesive strength of the epoxy resin formulation as compared to the bis ureide having an average molecular weight of 2,000 and made in accordance with the disclosure in U.S. Ser. No. 743,814 filed on Nov. 22, 1976. Specifically, a smaller amount of the additive of the instant invention is required to improve the adhesive strength of the resin than is required if a bis ureide having an average molecular weight of 2,000 were utilized.

EXAMPLES 7-10

These examples illustrate the improved adhesive properties of resins prepared as in examples 2-6 above except that the curing agent in these examples was a bis (amino propyl) derivative of JEFFAMINE® D-230. This bis (amino propyl) derivative is the product of the cyanoethylation of JEFFAMINE® D-230.

TABLE II

| Formulation | Examples | | | |
|---|---|---|---|---|
| | 7 | 8 | 9 | 10 |
| Epoxide, pbw (Eq. 190) | 100 | 100 | 100 | 100 |
| Curing agent, pbw[1] | 25 | 25 | 25 | 25 |
| Accelerator, pbw[2] | 5 | 5 | 5 | 5 |
| Bis ureide pbw[3] | 0 | 1 | 2 | 5 |
| Tensile shear, psi[4] | 1200 | 1600 | 2600 | 3600 |

[1]A bis (amino propyl) derivative of "JEFFAMINE® D-230
[2]A piperazine-triethanolamine admixture (30:70) sold by Jefferson Chemical Company, Austin, Texas 78751 under the name "Accelerator 398"
[3]The product of Example 1
[4]Cure: 7 days, Room Temp.

EXAMPLES 11-14

In these examples the resins were prepared as in examples 2-6 except the curing agent used in this example was a polyoxypropylene diamine having an average molecular weight of 400. These examples further demonstrate the surprising improvement in the adhesive properties of the resins prepared in accordance with the instant invention. The peel strength of the various resins was tested as indicated in Table III below.

TABLE III

| Formulation | Examples | | | |
|---|---|---|---|---|
| | 11 | 12 | 13 | 14 |
| Epoxide, pbw (Eq. 190) | 100 | 100 | 100 | 100 |
| Curing agent, pbw[1] | 50 | 50 | 50 | 50 |
| Accelerator, pbw[2] | 10 | 10 | 10 | 10 |
| bis ureide pbw[3] | 0 | 2 | 5 | 20 |
| peel strength, pli[4] | 8.8 | 26.1 | 27.9 | 36.1 |

[1]Sold by Jefferson Chemical Company, Austin, Texas 78751 under the name "JEFFAMINE® D-400"
[2]A piperazine-triethanolamine admixture (30:70) sold by Jefferson Chemical Company, Austin, Texas 78751 under the name "Accelerator 398"
[3]The product of Example 1
[4]Cure: 7 days, Room Temp.

EXAMPLES 15-19

The resins of these examples were prepared in a manner similar to those prepared in examples 2-6 except that the curing agent which was utilized in these examples was a diethylene glycol bis (polyamine). Again, the examples demonstrate the surprising improvement in the adhesive strength of the epoxy formulations which employed the additive of the instant invention.

TABLE IV

| Formulation | Examples | | | | |
|---|---|---|---|---|---|
| | 15 | 16 | 17 | 18 | 19 |
| Epoxide, pbw (Eq. 190) | 100 | 100 | 100 | 100 | 100 |
| Curing agent, pbw[1] | 30 | 30 | 30 | 30 | 30 |

TABLE IV-continued

| Formulation | Examples | | | | |
|---|---|---|---|---|---|
| | 15 | 16 | 17 | 18 | 19 |
| Bis ureide pbw[2]) | 0 | 1 | 2 | 5 | 10 |
| peel strength, pli[3]) | — | 7.7 | 10.3 | 14.2 | 28.5 |

[1)]Diethylene glycol bis (propylamine)
[2)]The product of Example 2
[3]Cure: 7 days, Room Temp.

EXAMPLES 20-24

In these examples epoxy resins were prepared as in examples 2-6 except that no accelerator was utilized and each resin was cured with triethylenetetramine. As with the other examples, the results demonstrate that the adhesive strength of epoxy formulations are improved when the additive of the instant invention is utilized.

TABLE V

| Formulation | Examples | | | | |
|---|---|---|---|---|---|
| | 20 | 21 | 22 | 23 | 24 |
| Epoxide, pbw (Eq. 190) | 100 | 100 | 100 | 100 | 100 |
| Curing agent, pbw[1]) | 12 | 12 | 12 | 12 | 12 |
| Bis ureide pbw[2]) | 0 | 1 | 2 | 5 | 10 |
| Tensile shear, psi[3]) | 800 | 1200 | 1850 | 1600 | 1400 |

[1)]Triethylenetetramine
[2)]The product of Example 1
[3)]Cure: 7 days, Room Temp.

In view of the preceding description, further modifications and alternative embodiments of the instant invention will be apparent to those skilled in the art. Accordingly, the preceding description is to be construed as explanatory and illustrative only and is for the purpose of teaching and enabling those skilled in the art to practice this invention.

While the preferred embodiment of the above-described invention is to be understood to be the best mode presently contemplated, it is by no means the only embodiment possible. The scope of the invention is defined by the following claims and by equivalent modifications and variations that fall within the true spirit of the invention.

What is claimed is:

1. An additive for increasing the adhesive strength of a curable epoxy resin composition comprising a vicinal polyepoxide and a polyamine curing agent, which additive consists essentially of a bis ureide of a polyoxylakylene polyamine having the formula:

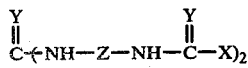

wherein X is hydrogen or a primary amino group; Y is oxygen or sulfur; and Z is a polyoxyalkylene group having a sufficient molecular weight such that said additive has an average molecular weight of at least 4,000.

2. The additive of claim 1 wherein the polyoxyalkylene group is a polyoxypropylene group.

3. The additive of claim 2 wherein X is a primary amino group and Y is oxygen.

4. The composition of claim 2, wherein X is hydrogen and Y is oxygen.

5. The composition of claim 2 wherein X is a primary amino group and Y is sulfur.

6. The composition of claim 2 wherein X is hydrogen and Y is sulfur.

7. An epoxy resin composition produced from a curable admixture of which comprises:
   a vicinal polyepoxide having an epoxide equivalency of greater than 1.8;
   an effective amount of a polyamine curing agent having at least three reactive amino hydrogens; and
   an effective amount of an adhesive strengthening additive consisting essentially of a bis ureide of a polyoxyalkylene polyamine, said additive having an average molecular weight of least 4,000 and having the formula:

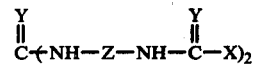

wherein X is hydrogen or a primary amino group; Y is oxygen or sulfur; and Z is a polyoxyalkylene group.

8. The composition of claim 7 which further comprises an effective amount of a curing accelerator.

9. The composition of claim 7 wherein said vicinal polyepoxide is more than 80% by weight of a polyglycidyl ether of polyhydric phenols, wherein said polyamine curing agent is a polyoxyalkylene polyamine, and wherein said curing accelerator comprises a combination of piperazine and an alkanolamine in a weight ratio of about 1:8 to 1:1.

10. The composition of claim 9 wherein said vicinal polyepoxide is a polyglycidyl ether of a polyhydric phenol, wherein said polyamine curing agent is a polyoxyalkylene polyamine having an amine equivalent weight of from 20 to about 70.

11. The composition of claim 10 wherein said curing agent is selected from polyoxyalkylene polyamines of the formula:

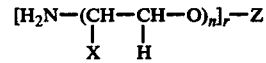

wherein X is hydrogen, a methyl radical or an ethyl radical; z is a hydrocarbon radical having 2 to 5 carbon atoms forming from two to four external ether linkages; n is a number from 1 to about 15 and r is a number from 2 to 4; or the formula:

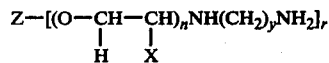

wherein X, Z, n and r are defined as above and Y is 2 or 3.

12. A curable resin composition comprising a diglycidyl ether of 4,4-isopropylidene bisphenol; an effective amount of a primary amine-containing curing agent consisting essentially of a polyoxypropylene diamine having a molecular weight of from about 200 to 250, an accelerator of piperazine and a triethanolamine in a weight ratio of 3 to 7; and, an effective amount of an adhesive strengthening additive consisting essentially of a bis ureide of a polyoxyalkylene polyamine, said additive having an average molecular weight of at least 4,000 and having the formula:

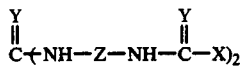

wherein X is hydrogen or a primary amino group; Y is oxygen or sulfur; and Z is a polyoxyalkylene group.

13. A method for increasing the adhesive strength of an epoxy resin composition, being the cured product of a curable admixture comprising a vicinal polyepoxide having an epoxide equivalency of greater than 1.8; and an effective amount of a polyamine curing agent having at least 3 reactive amino hydrogens comprising the step of:

adding to said curable admixture an effective amount of an adhesive strengthening additive consisting essentially of a bis ureide of a polyoxyalkylene polyamine, said additive having an average molecular weight of at least 4,000 and having the formula:

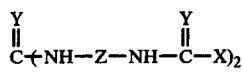

wherein X is hydrogen or a primary amino group; Y is oxygen or sulfur; and Z is a polyoxyalkylene group.

* * * * *